United States Patent [19]

Olmedo et al.

[11] Patent Number: 4,474,666
[45] Date of Patent: Oct. 2, 1984

[54] BALANCED-ACTIVITY IMPROVED INVERSE EMULSION TO INHIBIT BRITTLE LUTITE HYDRATION IN OIL FIELDS

[75] Inventors: Eduardo P. Olmedo, Lindavista; Rosa de J. Hernandez Alvarez, Naucalpan; Carlos D. Barrera, Revolucion; José D. Garcia Ramos, Naucalpan, all of Mexico

[73] Assignee: Instituto Mexicano del Petroleo, Mexico

[21] Appl. No.: 378,904

[22] Filed: May 17, 1982

[30] Foreign Application Priority Data

May 20, 1981 [MX] Mexico .................................. 187401

[51] Int. Cl.³ .......................... E21B 43/22; C09K 7/06
[52] U.S. Cl. ................................. 252/8.5 P; 166/274; 166/275; 252/8.5 M; 252/8.55 R
[58] Field of Search ........... 252/8.5 M, 8.5 P, 8.55 R; 166/274, 275

[56] References Cited

U.S. PATENT DOCUMENTS

| 3,811,504 | 5/1974 | Flournoy et al. | 166/274 |
| 3,827,497 | 8/1974 | Dycus et al. | 166/274 |
| 3,852,201 | 12/1974 | Jackson | 252/8.5 P |
| 4,306,980 | 12/1981 | Brandt et al. | 252/8.5 M |
| 4,381,241 | 4/1983 | Romenesko et al. | 252/8.55 R |

FOREIGN PATENT DOCUMENTS

| 1285605 | 8/1972 | United Kingdom | 252/8.5 P |
| 1316606 | 5/1973 | United Kingdom | 252/8.5 P |

*Primary Examiner*—Christine M. Nucker
*Attorney, Agent, or Firm*—Finnegan, Henderson, Farabow, Garrett & Dunner

[57] ABSTRACT

An improved inverse emulsion for use as a drilling fluid that inhibits brittle lutite hydration. The emulsion includes a heavy oil; brine; a viscosity agent with thermostabilizing properties; an emulsifying agent; a thickening agent; a gelatinizing additive; and an alkaline earth metal hydroxide. The emulsion avoids hole collapsing and improves well gage stability.

8 Claims, No Drawings

BALANCED-ACTIVITY IMPROVED INVERSE EMULSION TO INHIBIT BRITTLE LUTITE HYDRATION IN OIL FIELDS

BACKGROUND OF THE INVENTION

This invention relates to an improved inverse emulsion to inhibit brittle lutite hydration. The improved inverse emulsion is made up of the following elements: special-type diesel oil; viscosity agent with thermostabilizing properties acting as the main controller of filtration properties and as a secondary emulsifier; main emulsifying agent acting as well as a wetting agent for the thickening solids; calcium chloride brine; thickening agent; gelatinizing agent and hydrated calcium hydroxide.

Conventionally, a drilling fluid whose consistency resembles that of a lubricating oil, is used in a circulating system with rotary drilling mechanisms. The fluid is pumped into the well through the drilling bit, which it lubricates and cools, and then it is returned to a hydraulic-fill dam on the surface. In this way it removes cuttings and carries them out of the well to the surface, where thick particles are removed, leaving the fluid in good condition to be used again in a continuous-circulation process.

Reasons for using drilling fluids are varied and complex. One of the main reasons for their use is the desire to exert an adequate hydrostatic pressure in order to prevent gas leaks and thus avoid well fires.

Taking into consideration that hydrostatic pressure depends, to a large extent, on a fluid's specific gravity, it may be increased, as indicated in the present invention, through the addition of a heavy material such as barite. On the other hand, drilling fluid should have an adequate viscosity, i.e., it should be viscous enough to remove cuttings. However, at the same time, it should be pumpable and allow heavy particles to settle out in the hydraulic-fill dams, so that it may be used again.

An important property of the drilling fluid is that in case of a temporary shutdown, the fluid's gelling capabilities should be enough to prevent suspended cuttings from settling out since, otherwise, those cuttings would stick to the well's shaft and obstruct restarting operations and their final removal from the fluid. Therefore, both its fluid viscosity and its gelling capability or gelatinousness, in case of a drilling or repair work shutdown, are of paramount importance. Consequently, the fluid should maintain cuttings suspended until work is resumed. This is known as a fluid's thixotropic property or gel intensity. Such a property may be enhanced through the addition of a bentonitetype clay or similar substances, as in the present invention where bentonite, previously reacted with ammonium quaternary salts, is used.

During oil well drilling, the drill frequently encounters brittle lutites or water-base muds that hydrate when they are in contact with water, causing landslides or hole instability. Thus fluids that act as agents to inhibit brittle lutite hydration have been developed and it has been known that inverse emulsions provide the best results.

SUMMARY OF THE INVENTION

The present invention relates to an improved inverse emulsion having a balanced-activity wherein a heavy oil such as diesel oil comprises the continuous or oily phase and a calcium chloride brine the dispersed or aqueous phase. The proportion of diesel oil to water in the emulsion is 60–90/40–10% by volume and the emulsion has densities of from 1.0 to 2.2 g/cm$^3$. Calcium chloride concentrations in brine are 25–32% by weight (approximately 250 000 to 320 000 ppm) and have a chemical activity of 0.50 to 0.80.

The elements that make up this emulsion have the following weight percentages relative to the total weight of emulsion: water-oil emulsion 25 to 90%; a viscosity additive 2.0 to 5.0%; a main emulsifier 0.5 to 2.0%; a thickening agent up to 72%; a gelatinizing additive up to 0.23%; an alkaline earth metal hydroxide up to 0.47%.

According to the present invention, the balanced-activity improved inverse emulsion, is characterized by the use of a nonsaturated calcium chloride brine, in concentrations that vary depending on the characteristics of the formations to be drilled, and which allow adjustments in the dispersed-phase activity, as well as by the use of a viscosity and thermostabilizer agent that controls filtration properties and acts as a secondary emulsifier. This agent's effects, combined with those of the water-diesel oil emulsion and other agents, make the emulsion's balanced activity possible, resulting in a stabilized hole when drilling and a more uniform gage to the well.

Therefore, one of the objects of the present invention is to provide a balanced-activity improved inverse emulsion suitable for use as an oil well repairing and drilling fluid that inhibits brittle lutite hydration.

Another object of this invention is to provide a balanced-activity improved inverse emulsion capable of accepting adjustments in brine concentrations, depending on the formations to be drilled, to obtain stabilized holes while drilling.

A further object of the present invention is to provide a balanced-activity improved inverse emulsion that also can serve as a packing fluid, suspending heavy materials such as barite and cuttings resulting from drilling, having an improved stability at high temperatures and against fresh and salt water polution, and capable of controlling formation fluid loss.

DETAILED DESCRIPTION OF THE INVENTION

The balanced-activity improved inverse emulsion of this invention is made up of a series of agents and additives that form an inverse emulsion system when mixed with diesel oil or other heavy oils as the oily phase of the emulsion and calcium brine as aqueous phase. In addition to diesel oil and calcium chloride brine, the improved inverse emulsion contains the following elements: a gilsonite and blown asphalt-based thermostabilizer and viscosity agent; a main emulsifying agent having as a basic ingredient the calcium salt of a sulfonic aromatic $C_{10}$–$C_{18}$ alkyl acid; a barite based thickening agent; an organophyllousclay gelatinizing agent and, finally, hydrated calcium hydroxide as an auxiliary agent to control filtration properties. All these elements together provide the emulsion with certain characteristics, such as:

(a) Capability of suspending heavy materials such as barite and cuttings from drilling formations, or grinding materials in case of repair work.

(b) Viscosity values that make it possible to remove or transport formation cuttings without allowing them to settle when circulation of the emulsion stops.

(c) Preservation of its properties when the emulsion is subject to high temperatures of approximately 130° C.

(d) Resistance to breakdown or separation into its two phases when foreign solids such as formation cuttings exceed 10% of the emulsion's volume.

(e) Resistance to separation when 30% water is incorporated into the emulsion.

(f) High resistance to electric current flow.

The complex additives or agents that form part of the balanced-activity improved inverse emulsion according to the present invention have special properties that confer to this emulsion the above-mentioned characteristics.

Such complex additives are:

(a) Thermostabilizing and viscosity agent.

This agent is a dark-gray powder which is the product of the interaction of blown asphalt, gilsonite, sulfuric acid and triethanolamine, all neutralized with calcium hydroxide. It is partially dispersable in diesel oil and provide emulsions with viscosity, stability at high temperatures, and control of its filtration properties. It is the emulsion's basic additive and has secondary effects as an emulsifier. This additive is obtained as follows: A reactor is loaded with asphalt at a temperature of 180°–270° C. and is stirred and heated. Gilsonite is melted in a separate container and then it is fed into the reactor together with the slow addition of sulfuric acid. Care is taken that the temperature of the mixture is kept constant. After finishing the addition, stirring and heating is continued for some minutes more while slowly adding triethanolamine until its total incorporation homogenizes the mixture. Immediately afterwards, hydrated lime is slowly added while controlling any foam formed. Stirring and heating is continued for an additional hour to complete reaction. The product is unloaded on trays where it solidifies. Finally, it is ground with hydrated lime.

(b) The main emulsifying agent.

It is a brown dark liquid having a density of about 1.0 g/cm$^3$. It is an anionic emulsifier, whose basic ingredient is the calcium salt of a sulfonic aromatic $C_{10}$–$C_{18}$ aklyl acid. It is very effective in forming calcium chloride emulsions and facilitates the oil-water mixture, preventing dispersed particle agglomeration by suspending the particles coloidally. It also acts as a thickening-solids wetting agent.

(c) Gelatinizing agent.

This additive is a white fine powder that consists of an organiophyllous clay, which is the product of the reaction of a bentonite with an ammonium quaternary salt such as ammonium dialkyl-dimethyl chloride. It is a diesel-dispersable nonionic additive. It acts in the emulsion as gelatinizing agent allowing suspension of thickening solids.

Other elements that contribute to form inverse emulsions are: diesel oil, preferably a special type diesel oil having a low sulfur content (0.5%) which allows aniline points about 60° C. (ASTM-D-611-77) and lesser damage to the drilling equipment's rubber elements, due to its maximum creepage temperature [ASTM D-97-66 (1971)] of 0° C. from March to October and −5° C. from November to February as well as for its higher ignition point −52° C., (ASTM D-93-77). Calcium chloride is used in concentrations that vary from 250,000 to 320,000 ppm., depending on the characteristics of the formations to be drilled. This special property causes the system to exhibit a balanced activity; i.e. it makes possible the equalization of the brine activity with that of the formation, thus obtaining a stabilized hole while drilling. Hydrated calcium hydroxide is used as an auxiliary element to control filtering of the emulsion. Water such as industrial water is generally used when the emulsion is prepared in mud plants. However, when the emulsions are required to be prepared in the well, other types of water can be used. Finally, barite is used as a thickening agent to provide the emulsions with the required specific gravity.

EXAMPLES

Preparation of the Inverse Emulsion

In the following examples the percentages are by weight relative to the total weight of the inverse emulsion. The agents, oil and brine solutions are those described above.

EXAMPLE 1

23–24% of the diesel oil and 4–5% of the thermostabilizing and viscosity agent are mixed by stirring at room temperature in a container. After 75 minutes of stirring, 1.0–1.5% of the main emulsifier agent is added and stirring is continued for another 15 minutes. Then 18–19% of 32%-weight calcium chloride brine is added and the mixture is stirred for 120 minutes. 51–52% of barite as the thickening agent is added to the resultant mixture and after stirring for 60 minutes, a balanced-activity improved inverse emulsion is obtained having a density of 1.7 g/cm$^3$. It is tested by adjusting both its thixotropy with the addition of 0.1–0.2% of the gelatinizing additive and its filtration capacity with the addition of 0.2–0.3% of hydrated calcium hydroxide.

As a result, a balanced-activity improved inverse emulsion is obtained having the following characteristics:

| | |
|---|---|
| Diesel oil to water ratio (vol). | 70/30 |
| Density (g/cm$^3$) | 1.70 |
| Brine concentration (weight) | 32% |
| Chemical activity ($a_w$) | 0.58 |

EXAMPLE 2

Following EXAMPLE 1, an inverse emulsion is prepared having the following percentages: diesel oil 24–25%; thermostabilizing and viscosity additive 4.0–5.0%; main emulsifier 1.0–2.0%; 14–15% of 30%-weight calcium chloride brine; 55–56% thickening agent, 0.1–1.0% gelatinizing additive; and 0.20–0.25% hydrated calcium hydroxide.

The inverse emulsion obtained in this examples has the following characteristics:

| | |
|---|---|
| Diesel oil to water ratio (vol). | 74/26 |
| Density (g/cm$^3$) | 1.75 |
| Brine concentration (weight) | 30% |
| Chemical activity ($a_w$) | 0.63 |

EXAMPLE 3

Following EXAMPLE 1, an inverse emulsion is prepared having the following percentages: diesel oil 21–22%; thermostabilizing and viscosity additive 3–4%;

main emulsifier 1–2%; 8–9% of 25% weight calcium chloride brine; thickening agent 65–66%; gelatinizing additive 0.1–2.0%; and 0.1–0.2% hydrated calcium hydroxide.

The inverse emulsion obtained has the following characteristics:

| | |
|---|---|
| Diesel oil to water ratio (vol). | 80/20 |
| Density (g/cm$^3$) | 2.0 |
| Brine concentration (weight) | 25% |
| Chemical activity ($a_w$) | 0.74 |

TABLE 1 is a summary of the properties of the inverse emulsions of the above EXAMPLES.

TABLE 1

| Inverse Emulsion | Example 1 | Example 2 | Example 3 |
|---|---|---|---|
| Brine concentration, ppm | 320 000 | 300 000 | 250 000 |
| Apparent viscosity cp | 60 | 67 | 88 |
| Plastic viscosity cp | 44 | 50 | 68 |
| Yield point dynes/cm$^2$ | 153 | 163 | 229 |
| Initial gelatinousness 5 to 10 min. dines/cm$^2$ | 53–72 | 53–77 | 67–91 |
| Electric stability, volts. | 400 | 900 | 840 |
| High-temperature/pressure filtrate (150° C. and 35 kg/cm$^2$ · ml.) | 4.0 | 2.0 | 3.0 |

The following results were obtained when using the inverse emulsion, prepared in accordance with the present invention, in drilling a well in the area of Tabasco.

| Drilled Depth (meters) | Well's Diameter (Centimeters) | Formation |
|---|---|---|
| 3000 | 24.13 | Deposit |
| 3200 | 24.13 | |
| 3300 | 24.13 | |
| 3400 | 24.13 | |
| 3500 | 24.55 | |
| 3600 | 24.13 | Oligocene |
| 3700 | 25.40 | |
| 3800 | 24.97 | |
| 3900 | 24.13 | |
| 4000 | 24.13 | |
| 4100 | 24.97 | |
| 4200 | 24.13 | |
| 4300 | 24.13 | Eocene |
| 4400 | 24.13 | |
| 4500 | 24.13 | |
| 4600 | 24.13 | |

The above TABLE shows that the hole diameter in the drilling interval from 3000 to 4600 meters is essentially equal to that of the drilling bit used; i.e. 24.13 cm. (9.5 inches). This demonstrates that the inverse emulsions contribute to Deposit, Oligocene and Eocene formations drilling with a good well gage stability.

We claim:

1. An inverse emulsion that inhibits brittle lutite hydration comprising a heavy-oil/brine emulsion of heavy oil as the oily phase and an alkaline earth metal brine, having a concentration of from $2.5 \times 10^5$ to $3.2 \times 10^5$ ppm, as the aqueous phase, the ratio of heavy oil to brine being from 90–60/10–40% by volume and the oil/brine emulsion comprising from 25 to 90% by weight based on the total weight of the inverse emulsion; from 2.0 to 5.0% by weight of a viscosity and thermostabilizing agent; from 0.5 to 2.0% by weight of a calcium salt of a sulfonic aromatic $C_{10}$–$C_{18}$ alkyl acid as an emulsifying agent; up to 72% by weight of a thickening agent; up to 0.5% by weight of a gelatinizing agent; and up to 50% by weight of an alkaline earth metal hydroxide.

2. The inverse emulsion of claim 1 wherein the heavy oil is diesel oil having a low sulfur content and the brine is calcium chloride brine.

3. The inverse emulsion of claim 1 wherein the thermostabilizing and viscosity agent comprises blown asphalt and gilsonite.

4. The inverse emulsion of claim 1 wherein the gelatinizing agent is an organophyllous clay resulting from the reaction of a bentonite with ammonium dialkyldimethyl chloride.

5. The inverse emulsion of claim 1 wherein the thickening agent is barite.

6. The inverse emulsion of claim 1 wherein the alkaline earth metal hydroxide is hydrated calcium hydroxide.

7. The inverse emulsion of claim 1 wherein the heavy-oil/brine emulsion is in a ratio of from 80–60/20–40% by volume and the inverse emulsion contains from 2.8 to 4.6% of the thermostabilizing and viscosity agent; from 0.8 to 1.6% by weight of the emulsifying agent; from 0.07 to 0.23% of the gelatinizing agent and from 0.07 to 0.47% of the alkaline metal hydroxide.

8. An inverse emulsion that inhibits brittle lutite hydration comprising:
   (a) a heavy-oil/brine emulsion of diesel oil having a low sulfur content as the oily phase; and calcium chloride brine, having a concentration of $1.5 \times 10^5$ to $3.2 \times 10^5$ ppm. as the aqueous phase, the ratio of oil to brine being from 80–60/20–40% by volume and the oil/brine emulsion comprising from 25–90% by weight of the emulsion;
   (b) from 2.8 to 4.6% by weight of viscosity agent comprising blown asphalt and gilsonite;
   (c) from 0.8 to 1.6% by weight of a calcium salt of a sulfonic aromatic $C_{10}$–$C_{18}$ alkyl acid as an emulsifier;
   (d) from 0.07 to 0.27% by weight of the reaction product of a bentonite clay with ammonium dialkyl-dimethyl chloride as a gelatinizing agent;
   (e) up to 72% by weight of barite as a thickening agent; and
   (f) from 0.07 to 0.47% by weight of calcium hydroxide.

* * * * *